United States Patent Office

3,041,240
Patented June 26, 1962

3,041,240
ADDUCTS OF ALUMINUM MONOHYDROXY DIACETYLSALICYLATE AND ESTERS AND THE PROCESS FOR PREPARING SAME
William E. Smith and Amos R. Anderson, Adrian, Mich., assignors to Stauffer Chemical Company, New York, N.Y., a corporation of Delaware
No Drawing. Filed Feb. 17, 1960, Ser. No. 9,207
8 Claims. (Cl. 167—65)

This invention is concerned with novel compounds which are adducts of aluminum monohydroxy diacetylsalicylate and esters, and with novel processes for preparing these compounds.

Aluminum monohydroxy diacetylsalicylate has recently been used for the same purposes as aspirin. Aspirin is the common name for acetylsalicylic acid, an acidic compound. Aluminum monohydroxy diacetylsalicylate (sometimes called aluminum aspirin) possesses certain advantages over ordinary aspirin. The material, however, has several disadvantages which have hindered its use commercially.

It is difficult to form tablets of aluminum monohydroxy diacetylsalicylate by simple compression of the dry product, because the material has a fluffy texture and a low density. Aluminum monohydroxy diacetylsalicylate also has the disadvantage of being somewhat unstable and tending to decompose.

The present invention overcomes the above mentioned disadvantages of aluminum monohydroxy diacetylsalicylate. According to the present invention there are obtained novel compounds which, when taken internally, produce physiological results similar to those of aluminum monohydroxy diacetylsalicylate. In addition, the novel compounds of the present invention have a much greater density than aluminum aspirin, and may readily be formed into tablets by simple pressure with a conventional slugging machine.

The novel compounds of the present invention are adducts formed between aluminum monohydroxy diacetylsalicylate and an ester. It should be emphasized that these novel compounds have a definite chemical composition and are not mere mixtures. Rather they are discrete compounds in which the ester is chemically bonded (perhaps by some type of chelate formation) to the aluminum monohydroxy diacetylsalicylate. The exact nature of the chemical bonds is not understood, but there is conclusive evidence that the bonds exist. The best analytical data to date suggest that the compounds are composed of 4 molecules of aluminum monohydroxy diacetylsalicylate and one molecule of ester.

The conventional method for the manufacture of aluminum monohydroxy diacetylsalicylate has been by a reaction between 1 mole of aluminum alkoxide and 2 moles of aspirin. The reaction has been carried out with isopropanol as the solvent. The first step in the reaction results in the precipitation of aluminum monoalkoxy diacetylsalicylate. One mole of water is then added to the reaction mixture. The previously formed precipitate dissolves, but immediately thereafter aluminum monohydroxy diacetylsalicylate precipitates.

According to the present invention, the above procedure is modified. A slurry of 2 moles of aspirin in an ester solvent is reacted with 1 mole of aluminum alkoxide dissolved in an ester. Aluminum monoalkoxy diacetylsalicylate is formed, but it does not precipitate since it is soluble in ethyl acetate. One mole of water is added to the reaction mixture, and the ethyl acetate adduct of aluminum monohydroxy diacetylsalicylate gradually precipitates.

Various esters may be used in the present invention. Useful esters include, for example, ethyl acetate, 2-ethylhexyl acetate, the various isomeric amyl acetates, ethyl butyrate, isobutyl acetate, n-butyl acetate, ethyl benzoate and ethyl formate. Obviously the ester used should be one which is non-toxic and otherwise physiologically acceptable. Ethyl acetate is the preferred ester because of its low molecular weight which results in a final adduct having a high percentage of aluminum monohydroxy diacetylsalicylate. In addition the ethyl acetate adduct is desirable because its texture is such that it is particularly well suited for use in the tablet making operation.

The commonly used dosage of aspirin varies from about 1 grain in the case of children to about 5 to 15 grains in the case of adults. The dosage of the compounds of the present invention is approximately the same amount.

The following examples are given solely for the purpose of illustration and not are to be construed as limitations on the present invention, many variations of which will occur to those skilled in the art without departing from the spirit or scope of the invention.

*Example I*

To a beaker fitted with a stirrer and thermometer 2200 ml. of ethyl acetate is added. While stirring 360 grams of acetylsalicylic acid is added at room temperature to the ethyl acetate. The resulting mixture is treated with a solution of 204 grams of aluminum isopropoxide and 650 ml. of ethyl acetate (60° C.) The resulting mixture becomes clear and 18 ml. of water is added. A precipitate of aluminum monohydroxy diacetylsalicylate adduct is formed. The resulting precipitate is collected on a filter and dried at 45° C. The yield is 338.3 grams.

*Analysis.*—C, 54.42 (54.59); H, 4.45 (4.48); Al, 6.92 (7.03).

*Example II*

To a beaker fitted with a stirrer and thermometer 220 ml. of n-amyl acetate is added. While stirring 36 grams of acetylsalicylic acid is added at room temperature to the n-amyl acetate. The resulting mixture is treated with a solution of 20.4 grams of aluminum isopropoxide and 65 ml. of n-amyl acetate (30° C.). The resulting mixture becomes clear and 1.8 ml. of water is added. A precipitate of aluminum monohydroxy diacetylsalicylate adduct is formed. The precipitate is collected on a filter and dried at 45° C. The yield is 41.6 grams.

*Analysis.*—C, 55.50 (55.06); H, 5.25 (5.05); Al, 6.22 (6.00).

*Example III*

To a beaker fitted with a stirrer and thermometer 220 ml. of 2-ethylhexyl acetate is added. While stirring 36 grams of acetylsalicylic acid is added at room temperature to the 2-ethylhexyl acetate. The resulting mixture is treated with a solution of 20.4 grams of aluminum isopropoxide and 65 ml. of 2-ethylhexyl acetate (34° C.). The resulting mixture becomes clear and 1.8 ml. of water is added. A precipitate of aluminum monohydroxy diacetylsalicylate adduct is formed. The precipitate is collected on a filter and dried at 45° C. The yield is 18.9 grams.

*Analysis.*—C, 56.12 (56.36); H, 5.38 (5.41); Al, 5.19 (5.29).

*Example IV*

To a beaker fitted with a stirrer and thermometer 220 ml. of ethyl propionate is added. While stirring 36 grams of acetylsalicylic acid is added at room temperature to the ethyl propionate. The resulting mixture is treated with a solution of 20.4 grams of aluminum isopropoxide in 65 ml. of ethyl propionate (39° C.). The resulting mixture becomes clear and 1.8 ml. of water is added. The resulting precipitate is collected on a filter and dried at 45° C. The yield is 38.4 grams.

Example V

To a beaker fitted with a stirrer and thermometer 220 ml. of ethyl butyrate is added. While stirring 36 grams of acetylsalicylic acid is added at room temperature to the ethyl butyrate. The resulting mixture is treated with a solution of 20.4 grams of aluminum isopropoxide in 65 ml. of ethyl butyrate (49° C.). The resulting mixture becomes clear and 1.8 ml. of water is added. The resulting precipitate is collected on a filter and dried at 45° C. The yield is 34.9 grams.

Example VI

To a beaker fitted with a stirrer and thermometer 220 ml. of ethyl acetate is added. While stirring 36 grams of acetylsalicylic acid is added at room temperature to the ethyl acetate. The resulting mixture is treated with a solution of 24.6 grams of aluminum n-butoxide in 65 ml. of ethyl acetate. The resulting solution becomes clear and 8.8 ml. of water was added. To aid precipitation 80 cc. of isopropanol was added. The material was collected on a filter and dried at 45° C.

Example VII

To a beaker fitted with a stirrer and thermometer 220 ml. of isobutyl acetate is added. While stirring 36 grams of acetylsalicyclic acid is added at room temperature to the isobutyl acetate. The resulting mixture is treated with a solution of 20.4 grams of aluminum isopropoxide and 65 ml. of isobutyl acetate. The resulting mixture becomes clear and 1.8 ml. of water is added. The resulting precipitate is collected on a filter and dried at 45° C. The yield is 36.7 grams.

Example VIII

To a beaker fitted with a stirrer and a thermometer 1600 ml. of butyl acetate was added. While stirring 180 grams of acetylsalicyclic acid is added at room temperature to the butyl acetate. The resulting mixture is treated with a solution of 102 grams of aluminum isopropoxide in 500 ml. of butyl acetate. The resulting mixture cleared and 9 ml. of water is added. The resulting precipitate is collected on a filter and dried.

What is claimed is:
1. Adducts of aluminum monohydroxy diacetylsalicylate with an ester selected from the group consisting of ethyl acetate, 2-ethylhexyl acetate, amyl acetate, ethyl butyrate, butyl acetate, ethyl benzoate and ethyl formate.
2. Compounds having an empirical formula corresponding to 4 molecules of aluminum monohydroxy diacetylsalicylate chemically bonded as an adduct with 1 molecule of an ester selected from the group consisting of ethyl acetate, 2-ethylhexyl acetate, amyl acetate, ethyl butyrate, butyl acetate, ethyl benzoate and ethyl formate.
3. An ethyl acetate adduct of aluminum monohydroxy diacetylsalicylate.
4. The compound comprising 4 molecules of aluminum monohydroxy diacetylsalicylate as an adduct with 1 molecule of ethyl acetate.
5. A unitary dosage form suitable for oral administration and comprising from about 1 to about 15 grains of the ethyl acetate adduct of aluminum monohydroxy diacetylsalicylate.
6. A process for the preparation of an ester adduct of aluminum monohydroxy diacetylsalicylate, said process comprising contacting 2 moles of aspirin with 1 mole of an aluminum alkoxide in the presence of an ester selected from the group consisting of ethyl acetate, 2-ethylhexyl acetate, amyl acetate, ethyl butyrate, butyl acetate, ethyl benzoate and ethyl formate and adding 1 mole of water to the reaction mixture.
7. A process for the preparation of an ester adduct of aluminum monohydroxy diacetylsalicylate, said process comprising contacting 2 moles of aspirin with 1 mole of aluminum isopropoxide in the presence of an ester selected from the group consisting of ethyl acetate, 2-ethylhexyl acetate, amyl acetate, ethyl butyrate, butyl acetate, ethyl benzoate and ethyl formate and adding 1 mole of water to the reaction mixture.
8. A process for the preparation of the ethyl acetate adduct of aluminum monohydroxy diacetylsalicylate said process comprising reacting 2 moles of aspirin with 1 mole of aluminum isopropoxide in an ethyl acetate solvent and adding 1 mole of water.

No references cited.